(12) United States Patent  
Honjo

(10) Patent No.: US 8,224,150 B2
(45) Date of Patent: Jul. 17, 2012

(54) METHOD AND APPARATUS FOR RECORDING/REPRODUCTION

(75) Inventor: Masahiro Honjo, Osaka (JP)

(73) Assignee: Panasonic Corporation, Osaka (JP)

( * ) Notice: Subject to any disclaimer, the term of this patent is extended or adjusted under 35 U.S.C. 154(b) by 1040 days.

(21) Appl. No.: 12/172,023

(22) Filed: Jul. 11, 2008

(65) Prior Publication Data

US 2008/0298773 A1 Dec. 4, 2008

Related U.S. Application Data

(62) Division of application No. 09/987,681, filed on Nov. 15, 2001, now Pat. No. 7,415,188.

(30) Foreign Application Priority Data

Nov. 17, 2000 (JP) .................................. 2000-350957

(51) Int. Cl.
*H04N 9/80* (2006.01)
(52) U.S. Cl. ....................................... 386/241; 386/356
(58) Field of Classification Search .................. 386/200, 386/241, 338, 356
See application file for complete search history.

(56) References Cited

U.S. PATENT DOCUMENTS

| 5,455,684 A | 10/1995 | Fujinami et al. | |
| 5,504,585 A | 4/1996 | Fujinami et al. | |
| 5,568,274 A | 10/1996 | Fujinami et al. | |
| 5,621,840 A | 4/1997 | Kawamura et al. | |
| 5,991,502 A * | 11/1999 | Kawakami et al. | 386/329 |
| 6,002,834 A * | 12/1999 | Hirabayashi et al. | 386/248 |
| 6,012,091 A * | 1/2000 | Boyce | 709/219 |
| 6,606,449 B1 | 8/2003 | Ishikawa | |
| 6,845,214 B1 * | 1/2005 | Funaya et al. | 386/248 |
| 2003/0219038 A1 * | 11/2003 | Saeijs et al. | 370/503 |

FOREIGN PATENT DOCUMENTS

| EP | 0 622 002 B1 | 9/1993 |
| EP | 0 794 667 A2 | 9/1993 |
| EP | 0 676 756 A1 | 9/1994 |
| JP | 6-325553 | 11/1994 |
| JP | 2000-175150 | 6/2000 |

* cited by examiner

*Primary Examiner* — Huy T Nguyen
(74) *Attorney, Agent, or Firm* — Wenderoth, Lind & Ponack, L.L.P.

(57) ABSTRACT

The present invention provides a recording/reproduction apparatus which can record AV data at a variable rate as well as so as to enable trick plays. This recording/reproduction apparatus reads data from an HDD 8 and carries out a recording/reproduction process for the read data, and it comprises a reproduction means 10 for reading first MPEG data from the HDD 8, an analysis means 30 for obtaining positional information indicating positions of previous and subsequent GOPs of a GOP in the first MPEG data on the basis of the read first MPEG data, a navigation information addition means 6 for adding the positional information in a determined position of the first MPEG data to generate second MPEG data, and a recording means 7 for recording the second MPEG data on an optical disk 9.

16 Claims, 5 Drawing Sheets

METHOD AND APPARATUS FOR RECORDING/REPRODUCTION

This application is a divisional of application Ser. No. 09/987,681, filed Nov. 15, 2001 now is U.S. Pat. No. 7,415,188.

FIELD OF THE INVENTION

The present invention relates to a method and an apparatus for recording/reproduction and, more particularly, to data processing at dubbing of digital data, such as addition of navigation information, conversion of signal formats, and coding rate conversion.

BACKGROUND OF THE INVENTION

In recent years, DVD players have remarkably come into wide use. One reason for this lies in ease of usage at high-speed playback, instant access to specific video or audio and the like. This greatly relies upon information of a navigation pack that is defined in DVD video format. The navigation pack is located at the head of a VOBU (Video Object Unit) which is a data unit defined by DVD standards. In the navigation pack of each VOBU, positional information indicating positions of plural VOBUs which are located forward and backward of this VOBU is included. Therefore, in the DVD player, the playback position can be jumped to a desired position instantaneously. This is because DVD video data is ROM data and positional information of a VOBU (hereinafter, referred to as a future VOBU) which will be processed later than a target VOBU to be processed can be known at the authoring. The VOBU is composed of one or more GOPs (a GOP is a data unit in which random access is performed) and, for purposes of explanation, hereinafter assume that a VOBU is a GOP.

In recent years, systems in which AV data (audio/video data) is recorded in real time like DVD recorders or HDD recorders have become widely available. However, in these systems, positional information of future data (data located backward of data which is being recorded at the present time) cannot be written. In a case where data are all recorded at a fixed rate (CBR), this positional information can be written, while in this case the compression efficiency is undesirably reduced. More specifically, systems which record data at variable rates (VBR) in real-time recording devices, such as a DVD recorder and a HDD recorder, include no means for recording information concerning future data like the data recorded in the navigation pack.

In addition, as methods for dubbing digital signals which are temporarily recorded in a HDD, there are conceivable a method by which digital data is restored to analog data and then the analog data is dubbed, and a method by which data is dubbed in its original signal format (digital format). However, it is desirable that the amount of information should be reduced or the signal format should be converted, according to the capacity of a medium onto which data is dubbed (dubbing destination).

Also in the real-time recording devices, a method for recording the positional information of future data corresponding to the navigation pack of DVD video has been demanded.

SUMMARY OF THE INVENTION

The present invention has for its object to provide a recording/reproduction method and a recording/reproduction apparatus, which can record AV data at a variable rate as well as so as to enable trick plays.

Another object of the present invention is to provide a recording/reproduction method and a recording/reproduction apparatus, which can control the amount of AV data when the AV data is dubbed, according to the capacity of a recording medium as the dubbing destination.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided a recording/reproduction method by which data is read from a first recording medium containing first MPEG data which is divided taking a given data unit as one data group, and a recording/reproduction process for the read data is carried out, comprising: a reading step of reading the first MPEG data from the first recording medium; an information obtaining step of obtaining positional information which indicates positions of previous and subsequent data groups of a specific data group in the read first MPEG data with respect to the specific data group, on the basis of the first MPEG data; an information addition step of adding the positional information at a determined position in the first MPEG data to generate second MPEG data; and a recording step of recording the second MPEG data on a second recording medium. Therefore, the MPEG data can be recorded at a variable rate as well as so as to enable trick plays such as high-speed playback and instant access to specific video or audio.

According to a 2nd aspect of the present invention, there is provided a recording/reproduction method by which data is read from a first recording medium containing first MPEG data which is divided taking a given data unit as one data group, and a recording/reproduction process for the read data is carried out, comprising: a reading step of reading the first MPEG data from the first recording medium; a decoding step of decoding the read first MPEG data to generate a decoded signal; a re-encoding step of re-encoding the decoded signal so as to make the amount of information smaller than that of the first MPEG data, to generate second MPEG data; and a recording step of recording the second MPEG data on a second recording medium. Therefore, when the MPEG data is dubbed, the amount of the MPEG data can be controlled according to the capacity of the recording medium as the dubbing destination.

According to a 3rd aspect of the present invention, there is provided a recording/reproduction method by which data is read from a first recording medium containing first MPEG data which is divided taking a given data unit as one data group, and a recording/reproduction process for the read data is carried out, comprising: a reading step of reading the first MPEG data from the first recording medium; a decoding step of decoding the read first MPEG data to generate a decoded signal; a re-encoding step of re-encoding the decoded signal so as to make the amount of information smaller than that of the first MPEG data, to generate second MPEG data; an information obtaining step of obtaining positional information which indicates positions of previous and subsequent data groups of a specific data group in the second MPEG data with respect to the specific data group, on the basis of the second MPEG data; an information addition step of adding the positional information at a determined position in the second MPEG data, to generate third MPEG data; and a recording step of recording the third MPEG data on a second recording medium. Therefore, when the MPEG data is dubbed, the MPEG data can be recorded at a variable rate as well as so as to enable the trick plays such as high-speed reproduction and instant access to specific video or audio, and further the amount of the MPEG data can be controlled according to the capacity of the recording medium as the dubbing destination.

According to a 4th aspect of the present invention, in the recording/reproduction method of the 3rd aspect, the information obtaining step includes: a step of recording the second MPEG data on a third recording medium; a step of reading the second MPEG data from the third recording medium; and a step of obtaining positional information which indicates positions of previous and subsequent data groups of a specific data group in the read second MPEG data with respect to the specific data group, on the basis of the second MPEG data. Therefore, positional information which indicates positions with respect to each GOP, of its previous and subsequent GOPs can be easily obtained.

According to a 5th aspect of the present invention, in the recording/reproduction method of the 2nd aspect, the first recording medium contains MPEG data of a fixed rate as the first MPEG data, and in the re-encoding step, a decoded signal corresponding to the fixed-rate MPEG data is re-encoded, thereby generating MPEG data of a variable rate as the second MPEG data. Therefore, at the dubbing, the MPEG data can be converted from the fixed rate into the variable rate.

According to a 6th aspect of the present invention, in the recording/reproduction method of the 3rd aspect, the first recording medium contains MPEG data of a fixed rate as the first MPEG data, and in the re-encoding step, a decoded signal corresponding to the fixed-rate MPEG data is re-encoded, thereby generating MPEG data of a variable rate as the second MPEG data. Therefore, at the dubbing, while the MPEG data is converted from the fixed rate into the variable rate, the converted data can be made include positional information of GOPs required for the trick play.

According to a 7th aspect of the present invention, in the recording/reproduction method of the 6th aspect, the information obtaining step includes: a step of recording the variable-rate MPEG data on a third recording medium as the second MPEG data; a step of reading the variable-rate MPEG data from the third recording medium; and a step of obtaining positional information which indicates positions of previous and subsequent data groups of a specific data group in the read variable-rate MPEG data with respect to the specific data group, on the basis of the variable-rate MPEG data. Therefore, positional information which indicates positions with respect to each GOP, of its previous and subsequent GOPs can be easily obtained.

According to an 8th aspect of the present invention, in the recording/reproduction method of the 2nd aspect, the re-encoding step includes: a conversion step of converting a decoded signal having a prescribed resolution, corresponding to the first MPEG data, into a signal having a resolution which is lower than the prescribed resolution; and a step of re-encoding the converted signal to generate the second MPEG data. Therefore, the MPEG data can be dubbed with converting the data from a signal having a prescribed resolution into a signal having a resolution which is lower than the prescribed resolution.

According to a 9th aspect of the present invention, in the recording/reproduction method of the 3rd aspect, the re-encoding step includes: a conversion step of converting a decoded signal having a prescribed resolution, corresponding to the first MPEG data, into a signal having a resolution which is lower than the prescribed resolution; and a step of re-encoding the converted signal to generate the second MPEG data. Therefore, while the MPEG data is converted from a signal having a prescribed resolution into a signal having a resolution which is lower than the prescribed resolution, the converted MPEG data is made include the positional information of GOPs required for the trick play.

According to a 10th aspect of the present invention, in the recording/reproduction method of the 8th or 9th aspect, the decoded signal corresponding to the first MPEG data is a high-definition signal and the signal which is generated by converting the resolution of the decoded signal is a standard signal. Therefore, the MPEG data can be dubbed with converting the data from a high-definition signal into a standard signal.

According to an 11th aspect of the present invention, in the recording/reproduction method of the 9th aspect, the information obtaining step includes: a step of recording the second MPEG data on a third recording medium; a step of reading the second MPEG data from the third recording medium; and a step of obtaining positional information which indicates positions of previous and subsequent data groups of a specific data group in the read second MPEG data with respect to the specific data group, on the basis of the second MPEG data. Therefore, the positional information which indicates positions with respect to each GOP, of its previous and subsequent GOPs can be easily obtained.

According to a 12th aspect of the present invention, there is provided a recording/reproduction method by which MPEG data that is obtained by coding a video signal by an MPEG coding system and is divided taking a given data unit as one data group is recorded/reproduced, comprising: a storage step of storing first MPEG data corresponding to one or more data groups in a data storage unit; a reading step of reading the first MPEG data from the data storage unit; an information obtaining step of obtaining positional information which indicates positions of previous and subsequent data groups of a specific data group in the read first MPEG data with respect to the specific data group, on the basis of the first MPEG data; an information addition step of adding the positional information at a determined position in the first MPEG data, to generate second MPEG data; and a recording step of recording the second MPEG data on a second recording medium. Therefore, the MPEG data can be recorded in approximately real time with adding the positional information of GOPs required for the trick play.

According to a 13th aspect of the present invention, the recording/reproduction method of any of the 1st, 2nd and 3rd aspects includes: a coding step of coding a video signal by an MPEG coding system to create video data and simultaneously coding an audio signal to create audio data; a multiplexing step of multiplexing the audio data and the video data to generate the first MPEG data; and a preprocessing recording step of recording the first MPEG data on the first recording medium. Therefore, when the MPEG data is dubbed, the amount of the MPEG data can be controlled according to the capacity of the recording medium as the dubbing destination.

According to a 14th aspect of the present invention, in the recording/reproduction method of any of the 1st, 3rd and 12th aspects, in the information addition step, the positional information indicating the positions of the previous and subsequent data groups of the specific data group with respect to the specific data group is added in the vicinity of the head of the specific data group. Therefore, the MPEG data can be reproduced even by DVD players.

According to a 15th aspect of the present invention, in the recording/reproduction method of any of the 1st, 2nd, 3rd and 12th aspects, in the reading step, the first MPEG data is read at a speed which is higher than a real time reproduction speed at which the first MPEG data is normally decoded and displayed, and in the recording step, the second MPEG data is written on the second recording medium at a speed which is higher than a real time reproduction speed at which the second MPEG data is normally decoded and displayed. Therefore, a data processing such as the addition of positional information to MPEG data, the coding rate conversion, the conversion of signal formats can be performed during the high-speed dubbing of the MPEG data.

According to a 16th aspect of the present invention, in the recording/reproduction method of the 2nd or 3rd aspect, in the decoding step, only video data included in the first MPEG data is decoded to generate a decoded video signal; in the re-encoding step, the decoded video signal is re-encoded to generate re-encoded video data, and the re-encoded video data is multiplexed with delayed audio data which is obtained by delaying audio data included in the first MPEG data, thereby generating multiplexed data; and in the recording step, the multiplexed data is recorded as the second MPEG data. Therefore, degradation of the quality of audio due to the re-encoding of audio signals can be avoided.

According to a 17th aspect of the present invention, in the recording/reproduction method of the 2nd or 3rd aspect, in the re-encoding step, one of data processings: a data insertion processing for inserting external audio data which is obtained by coding an audio signal from outside, into the second MPEG data; a data replacement processing for replacing the external audio data with audio data in the second MPEG data; and a data composition processing for composing the external audio data with the audio data in the second MPEG data, is performed. Therefore, post recording at the dubbing can be performed.

According to an 18th aspect of the present invention, in the recording/reproduction method of any of the 1st, 2nd, 3rd and 12th aspects, the MPEG data is coded data which conforms to any of MPEG1, MPEG2, MPEG4, and MPEG7 standards. Therefore, the MPEG data can be recorded at a variable rate as well as so as to enable trick plays such as high-speed playback and instant access to specific video or audio. Further, when the MPEG data is dubbed, the amount of the MPEG data can be controlled according to the capacity of the recording medium as the dubbing destination.

According to a 19th aspect of the present invention, in the recording/reproduction method of any of the 1st, 2nd and 3rd aspects, the first and second MPEG data are transport streams or program streams. Therefore, the MPEG data can be recorded at a variable rate as well as so as to enable trick plays such as high-speed playback and instant access to specific video or audio. Further, when the MPEG data is dubbed, the amount of the MPEG data can be controlled according to the capacity of the recording medium as the dubbing destination.

According to a 20th aspect of the present invention, in the recording/reproduction method of any of the 1st, 2nd, 3rd and 12th aspects, the data group is composed of one or plural GOPs each being an access unit at reproduction. Therefore, at the dubbing of AV data conforming to a DVD video format, which is divided into VOBUs each being composed of one or more GOPs, the addition of navigation information and the reduction of the amount of information can be performed.

According to a 21st aspect of the present invention, in the recording/reproduction method of any of the 1st, 2nd, 3rd and 12th aspects, the first and second recording media are any of a hard disk, an optical disk, a magneto-optical disk, a semiconductor memory, and a magnetic tape. Therefore, dubbing of AV data can be performed with little constraints of the type of a recording medium which contains the AV data or the type of a recording medium which is a dubbing destination of the AV data.

According to a 22nd aspect of the present invention, in the recording/reproduction method of any of the 1st, 2nd, 3rd and 12th aspects, the first and second recording media are one and the same data recording medium. Therefore, the number of recording media which are mounted on the recording/reproduction apparatus can be reduced.

According to a 23rd aspect of the present invention, there is provided a recording/reproduction apparatus which read data from a first recording medium containing first MPEG data which is divided taking a given data unit as one data group, and carries out a recording/reproduction process for the read data, comprising: a reading unit for reading the first MPEG data from the first recording medium; an information obtaining unit for obtaining positional information which indicates positions of previous and subsequent data groups of a specific data group in the read first MPEG data with respect to the specific data group, on the basis of the first MPEG data; an information addition unit for adding the positional information at a determined position in the first MPEG data, to generate second MPEG data; and a recording unit for recording the second MPEG data on a second recording medium. Therefore, the MPEG data can be recorded at a variable rate as well as so as to enable trick plays such as high-speed playback and instant access to specific video or audio.

According to a 24th aspect of the present invention, there is provided a recording/reproduction apparatus which read data from a first recording medium containing first MPEG data which is divided taking a given data unit as one data group, and carries out a recording/reproduction process for the read data, comprising: a reading unit for reading the first MPEG data from the first recording medium; a decoding unit for decoding the read first MPEG data to generate a decoded signal; a re-encoding unit for re-encoding the decoded signal so as to make the amount of information smaller than that of the first MPEG data, to generate second MPEG data; and a recording unit for recording the second MPEG data on a second recording medium. Therefore, when the MPEG data is dubbed, the amount of the MPEG data can be controlled according to the capacity of the recording medium as the dubbing destination.

According to a 25th aspect of the present invention, there is provided a recording/reproduction apparatus which read data from a first recording medium containing first MPEG data which is divided taking a given data unit as one data group, and carries out a recording/reproduction process for the read data, comprising: a reading unit for reading the first MPEG data from the first recording medium; a decoding unit for decoding the read first MPEG data to generate a decoded signal; a re-encoding unit for re-encoding the decoded signal so as to make the amount of information smaller than that of the first MPEG data, to generate second MPEG data; an information obtaining unit for obtaining positional information which indicates positions of previous and subsequent data groups of a specific data group in the second MPEG data with respect to the specific data group, on the basis of the second MPEG data; an information addition unit for adding the positional information at a determined position in the second MPEG data, to generate third MPEG data; and a recording unit for recording the third MPEG data on a second recording medium. Therefore, when the MPEG data is dubbed, the MPEG data can be recorded at a variable rate as well as so as to enable the trick plays, and further the amount of the MPEG data can be controlled according to the capacity of the recording medium as the dubbing destination.

According to a 26th aspect of the present invention, there is provided a recording/reproduction apparatus which records/reproduces MPEG data that is obtained by coding a video signal by an MPEG coding system, comprising: a memory unit for storing first MPEG data corresponding to one or more data groups; a reading unit for reading the first MPEG data from the memory unit; an information obtaining unit for obtaining positional information which indicates positions of previous and subsequent data groups of a specific data group in the read first MPEG data with respect to the specific data group, on the basis of the first MPEG data; an information addition unit for adding the positional information at a determined position in the first MPEG data, to generate second MPEG data; and a recording unit for recording the second MPEG data on a second recording medium. Therefore, the MPEG data can be recorded approximately in real time with adding the positional information of GOPs required for the trick play.

According to a 27th aspect of the present invention, there is provided a recording medium which contains second MPEG data generated by the recording/reproduction method of the 1st aspect and, in this recording medium, the second MPEG data is divided taking a given data unit as one data group, and has a data structure including positional information which indicates positions of previous and subsequent data groups of a specific data group with respect to the specific data group. Therefore, dubbed MPEG data can be subjected to the trick play.

According to a 28th aspect of the present invention, there is provided a personal computer which implements a data processing, by software, for reading data from a first recording medium containing first MPEG data which is divided taking a given data unit as one data group, and recording/reproducing the read data and, in the personal computer, the data processing includes: a reading process for reading the first MPEG data from the first recording medium; an information obtaining process for obtaining positional information which indicating positions of previous and subsequent data groups of a specific data group in the read first MPEG data with respect to the specific data group, on the basis of the first MPEG data; an information addition process for adding the positional information at a determined position in the first MPEG data, to generate second MPEG data; and a recording process for recording the second MPEG data on a second recording medium. Therefore, the process for recording the MPEG data at a variable rate as well as so as to enable the trick play can be carried out by software.

According to a 29th aspect of the present invention, there is provided a personal computer which implements a data processing, by software, for reading data from a first recording medium containing first MPEG data that is divided taking a given data unit as one data group, and recording/reproducing the read data and, in the personal computer, the data processing includes: a reading process for reading the first MPEG data from the first recording medium; a decoding process for decoding the read first MPEG data to generate a decoded signal; a re-encoding process for re-encoding the decoded signal so as to make the amount of information smaller than that of the first MPEG data, to generate second MPEG data; and a recording process for recording the second MPEG data on a second recording medium. Therefore, the process for performing the dubbing of the MPEG data with controlling the amount of the MPEG data according to the capacity of the recording medium as the dubbing destination can be implemented by software.

According to a 30th aspect of the present invention, there is provided a personal computer which implements a data processing, by software, for reading data from a first recording medium containing first MPEG data which is divided taking a given data unit as one data group, and recording/reproducing the read data and, in the personal computer, the data processing includes: a reading process for reading the first MPEG data from the first recording medium; a decoding process for decoding the read first MPEG data to generate a decoded signal; a re-encoding process for re-encoding the decoded signal so as to make the amount of information smaller than that of the first MPEG data, to generate second MPEG data; an information obtaining process for obtaining positional information which indicates positions of previous and subsequent data groups of a specific data group in the second MPEG data with respect to the specific data group, on the basis of the second MPEG data; an information addition process for adding the positional information at a determined position in the second MPEG data, to generate third MPEG data; and a recording process for recording the third MPEG data on a second recording medium. Therefore, the dubbing process for MPEG data by software can be made a process for recording the MPEG data at a variable rate as well as so as to enable the trick play, and further changing the amount of MPEG data according to the capacity of the recording medium as the dubbing destination.

According to a 31st aspect of the present invention, there is provided a personal computer which has a memory unit for holding MPEG data that is obtained by coding a video signal by an MPEG coding system and is divided taking a given data unit as one data group, and implements a data processing for recording/reproducing the MPEG data by software and, in the personal computer, the data processing includes: a storage process for storing first MPEG data corresponding to one or more data groups in a memory unit; a reading process for reading the first MPEG data from the memory unit; an information obtaining process for obtaining positional information which indicates positions of previous and subsequent data groups of a specific data group in the read first MPEG data with respect to the specific data group, on the basis of the first MPEG data; an information addition process for adding the positional information at a determined position in the first MPEG data, to generate second MPEG data; and a recording process for recording the second MPEG data on a second recording medium. Therefore, the process for recording the MPEG data approximately in real time with adding the positional information of GOPs required for the trick play can be implemented by software.

According to a 32nd aspect of the present invention, there is provided a recording/reproduction program for implementing a recording/reproduction process, by a computer, for reading data from a first recording medium containing first MPEG data which is divided taking a given data unit as one data group and recording/reproducing the read data and, in the recording/reproduction program, the recording/reproduction process includes: a reading step of reading the first MPEG data from the first recording medium; an information obtaining step of obtaining positional information which indicates positions of previous and subsequent data groups of a specific data group in the read first MPEG data with respect to the specific data group, on the basis of the first MPEG data; an information addition step of adding the positional information at a determined position in the first MPEG data, to generate second MPEG data; and a recording step of recording the second MPEG data on a second recording medium. Therefore, the process for recording the MPEG data at a variable rate as well as so as to enable the trick play can be implemented by software.

According to a 33rd aspect of the present invention, there is provided a recording/reproduction program for implementing a recording/reproduction process, by a computer, for reading data from a first recording medium containing first MPEG data which is divided taking a given data unit as one data group and recording/reproducing the read data and, in the recording/reproduction program, the recording/reproduction process includes: a reading step of reading the first MPEG data from the first recording medium; a decoding step of decoding the read first MPEG data to generate a decoded signal; a re-encoding step of re-encoding the decoded signal so as to make the amount of information smaller than that of the first MPEG data, to generate second MPEG data; and a recording step of recording the second MPEG data on a second recording medium. Therefore, the process for performing dubbing of the MPEG data with controlling the amount of the MPEG data according to the capacity of the recording medium as the dubbing destination can be implemented by software.

According to a 34th aspect of the present invention, there is provided a recording/reproduction program for implementing a recording/reproduction process, by a computer, for reading data from a first recording medium containing first MPEG data which is divided taking a given data unit as one data group and recording/reproducing the read data and, in the recording/reproduction program, the recording/reproduction process includes: a reading step of reading the first MPEG data from the first recording medium; a decoding step of decoding the read first MPEG data to generate a decoded signal; a re-encoding step of re-encoding the decoded signal so as to make the amount of information smaller than that of the first MPEG data, to generate second MPEG data; an information obtaining step of obtaining positional information which indicates positions of previous and subsequent data groups of a specific data group on the second MPEG data with respect to the specific data group, on the basis of the second MPEG data; an information addition step of adding the positional information at a determined position in the second MPEG data, to generate third MPEG data; and a recording step of recording the third MPEG data on a second recording medium. Therefore, the dubbing process for MPEG data by software can be made a process for recording the MPEG data at a variable rate as well as so as to enable the trick play, and further changing the amount of MPEG data according to the capacity of the recording medium as the dubbing destination.

According to a 35th aspect of the present invention, there is provided a recording/reproduction program for implementing a recording/reproduction process, by a computer, for recording/reproducing MPEG data which is obtained by coding a video signal by an MPEG coding system and is divided taking a given data unit as one data group and, in the recording/reproduction program, the recording/reproduction process includes: a storage step of storing first MPEG data corresponding to one or more data groups in a data storage unit; a reading step of reading the first MPEG data from the data storage unit; an information obtaining step of obtaining positional information which indicates positions of previous and subsequent data groups of a specific data group in the read first MPEG data with respect to the specific data group, on the basis of the first MPEG data; an information addition step of adding the positional information at a determined position in the first MPEG data, to generate second MPEG data; and a recording step of recording the second MPEG data on a second recording medium. Therefore, the process for recording the MPEG data approximately in real time with adding positional information of GOPs required for the trick play to the MPEG data can be implemented by software.

DETAILED DESCRIPTION OF THE PREFERRED EMBODIMENTS

Figure 1:
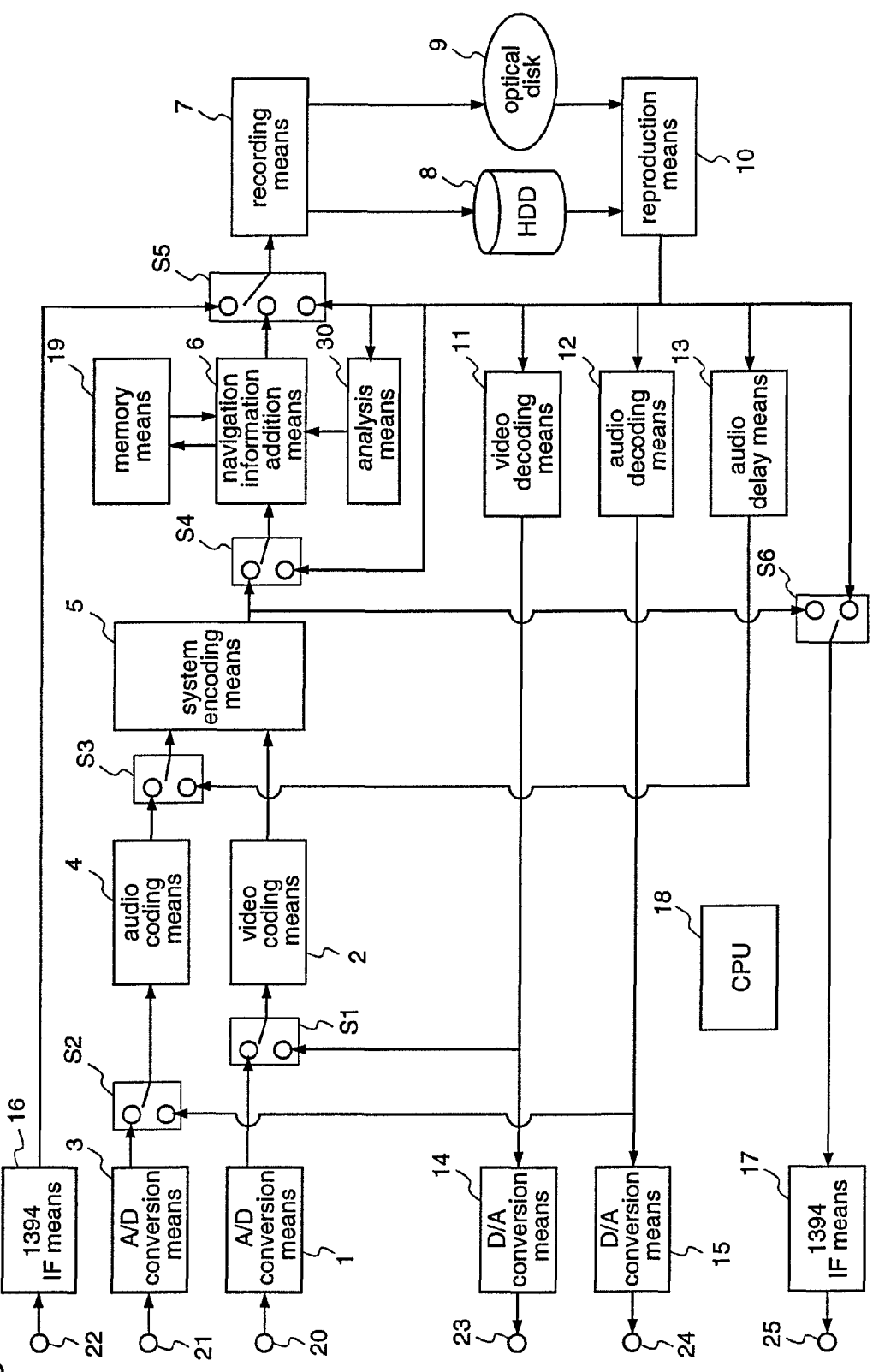
FIG. 1 is a block diagram for explaining a detailed structure of a recording/reproduction apparatus according to any of embodiments of the present invention.
Figure 2:
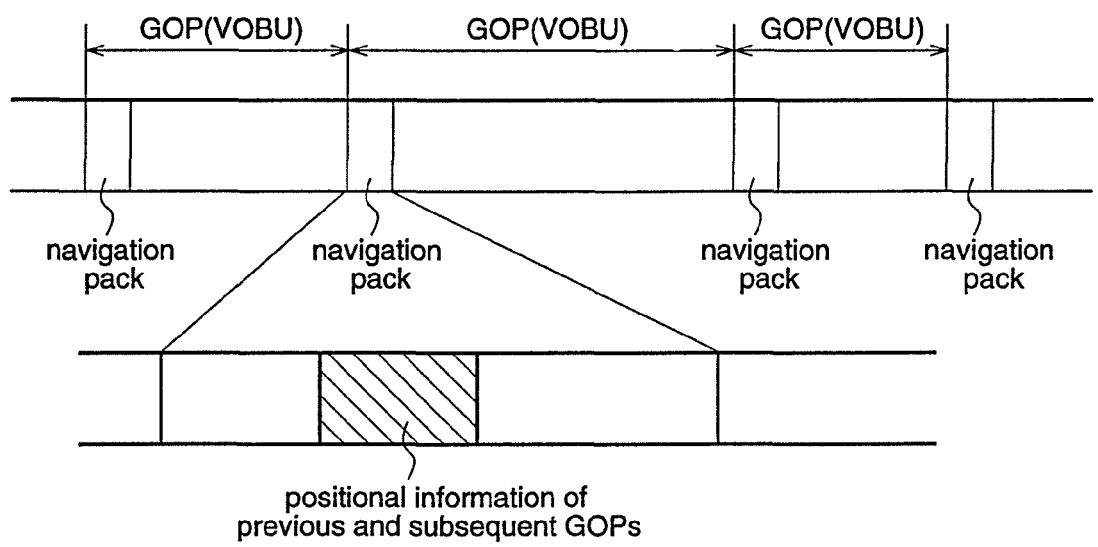
FIG. 2 is a diagram schematically showing a structure of a stream.
Figure 3:
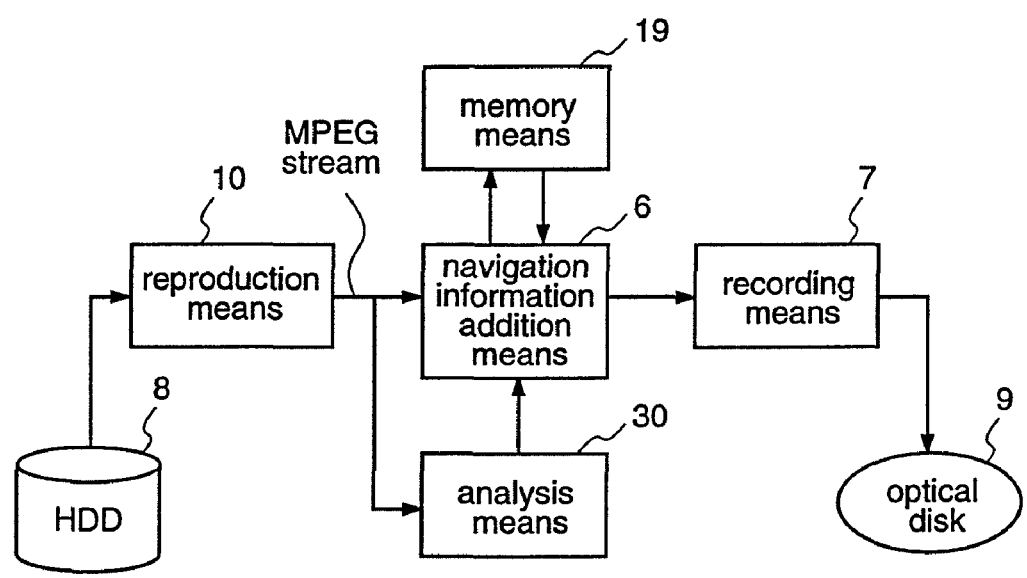
FIG. 3 is a block diagram schematically illustrating a structure of a recording/reproduction apparatus according to a first embodiment of the present invention.

Hereinafter, embodiments of the present invention will be described with reference to FIGS. 1 to 5.
[Embodiment 1]
FIGS. 1 and 3 are block diagrams for explaining a recording/reproduction method according to a first embodiment of the present invention. FIG. 1 shows the whole of a recording/reproduction apparatus for dubbing AV data by the recording/reproduction method. FIG. 3 shows a part of the recording/reproduction apparatus shown in FIG. 1.

MPEG data stored in a HDD 8 as a first recording medium is read from the HDD 8 and reproduced by a reproduction means 10, whereby a MPEG stream (AV data) is obtained. As an example of this MPEG stream, there are various kinds such as a transport stream, a program stream and an elementary stream. An analysis means 30 analyzes the position of each GOP on the MPEG stream, and checks the positional relationship between a predetermined GOP and previous and subsequent GOPs thereof. A navigation information addition means 6 adds the positional information which indicates the positions of the previous and subsequent GOPs at a determined position near the head of the predetermined GOP, according to an instruction from the analysis means 30. At this time, the navigation information addition means 6 uses a memory means 19 as required. The memory means 19 may be a semiconductor memory or a recording medium like a HDD. The MPEG stream to which the navigation information is added is recorded by a recording means 7 on an optical disk 9 as a second recording medium. Here, the predetermined GOP to which the navigation information is added is all GOPs which are included in the MPEG stream. However, the GOP to which the navigation information is added may be ones which are selected from all the GOPs included in the MPEG stream based on a certain criterion.

This operation is not limited to the case where this is performed in real time but there are cases where this is performed at a higher speed than the actual operation (normal decoding display operation) and where this is performed at a lower speed than the actual operation, which depends on the processing ability of the analysis means 30 or the like. Further, the processing of the analysis means 30 may be performed by the navigation information addition means 6 as a part of the navigation information addition process, or may be performed by a CPU 18.

Next, the recording/reproduction method according to the first embodiment will be described in more detail with reference to FIG. 1. FIG. 1 is a block diagram illustrating a detailed structure of the recording/reproduction apparatus according to the first embodiment.

A video signal inputted through a terminal 20 is A/D-converted by an A/D conversion means 1 and transmitted to a video coding means 2 via a switch S1, and coded video data outputted by the video coding means 2 is transmitted to a system encoding means 5.

An audio signal inputted through a terminal 21 is A/D-converted by an A/D conversion means 3 and transmitted to an audio coding means 4 via a switch S2, and coded audio data outputted by the audio coding means 4 is transmitted to the system encoding means 5 via a switch S3.

The video data and the audio data are multiplexed by the system encoding means 5, and MPEG data obtained by this multiplexing is transmitted to a switch S4 and a switch S6. A signal which has passed through the switch S4 is inputted to the navigation information addition means 6, and the output of the navigation information addition means 6 is outputted to a switch S5. The navigation information addition means 6 uses the memory means 19 as a storage medium as required.

A 1394 signal is inputted through a terminal 22, and outputted to the switch S5 via a 1394 I/F means 16. The output of the switch S5 is converted into a record signal by the recording means 7, and recorded in the HDD 8 as the first recording medium or on the optical disk 9 as the second recording medium. A reproduction signal which is obtained by reading and reproducing data from the HDD 8 as the first recording medium or the optical disk 9 as the second recording medium by the reproduction means 10 is supplied to a video decoding means 11, an audio decoding means 12, an audio delay means 13, the analysis means 30, the switch S4, the switch S5, and the switch S6.

A video signal decoded by the video decoding means 11 is supplied to the switch S1, as well as inputted to a D/A conversion means 14 and outputted through a terminal 23 as a reproduced video signal. An audio signal decoded by the audio decoding means 12 is supplied to the switch S2, as well as inputted to a D/A conversion means 15 and outputted through a terminal 24 as a reproduced audio signal. The output of the audio delay means 13 is inputted to the switch S3. The output of the switch S6 is inputted to a 1394 I/F means 17 and outputted through a terminal 25 in 1394 format. At this time, the CPU 18 controls the entire operation of the recording/reproduction apparatus.

Assume here a case where the signals from the terminals 20 and 21 are recorded at variable rates.

Signals are generated by the above-mentioned recording system, i.e., the means 1 to 7. At this time, the navigation information addition means 6 should add, to a predetermined GOP, the positional information of previous and subsequent GOPs of the predetermined GOP. However, the amount of data which will be recorded in the future cannot be estimated in the real-time recording, and thus the positional information of the previous and subsequent GOPs cannot be added. Therefore, the data inputted to the navigation information addition means 6 is transmitted to the recording means 7 without addition of the positional information of the previous and subsequent GOPs, then converted into a record signal, and recorded in the HDD 8.

FIG. 2 is a diagram schematically showing a stream that is compliant with the DVD video standards. In DVD, as described above, the data unit of VOBU is composed of one or plural GOPs. However, in this invention, for purposes of explanation, the description will be given assuming that the VOBU is a GOP. Information called navigation pack is added at the head of each GOP. In the navigation pack, positional information indicating positions of GOPs which are located forward and backward of the GOP is entered so as to be available at trick plays or the like. The DVD player implements the trick plays such as high-speed playback on the basis of this positional information.

Now, the data which has been recorded in the HDD 8 lacks the positional information of the previous and subsequent GOPs, shown by diagonal lines in FIG. 2, and thus the reproduction operation is not assured by the normal DVD player. However, the positional information of the previous and subsequent GOPs can be obtained by reading the already recorded data again from the HDD 8. In order to add the positional information that is obtained as described above, the recording/reproduction apparatus shown in FIG. 1 performs the following operations.

The following processes are carried out so that the CPU 18 can detect positional information of GOPs in the data recorded in the HDD 8.

For example, a process for performing reproduction of data (reading of data) for a predetermined section of the data recorded in the HDD 8 and analyzing reproduced data (read data) by the analysis means 30, or a process for recording and storing positional information of GOPs at a predetermined position of the HDD 8 when the recording means 7 records data in the HDD is carried out.

Thereafter, reproduced data which are read from the HDD 8 and reproduced by the reproduction means 10 is transmitted to the switch S4. Then, the reproduced data outputted from the switch S4 is subjected by the navigation information addition means 6 according to an instruction of the CPU 18 to a process for adding navigation information including positional information of previous and subsequent GOPs of each GOP, at a determined position at the head of each GOP, and recorded in the HDD 8 or on optical disk 9 through the recording means 7. Here, the recorded reproduced data includes the navigation information, whereby the data can be reproduced by the normal DVD player.

In the recording/reproduction apparatus according to this first embodiment, each of the means can be constituted by hardware or the process by each of the means can be implemented by software.

As described above, in this first embodiment, the position of each GOP on an MPEG stream is obtained, then positional information which indicates positions with respect to each GOP, of its previous and subsequent GOPs is added to the MPEG stream, and the MPEG stream to which the positional information is added is recorded on the optical disk 9. Therefore, the MPEG data can be recorded at a variable rate, as well as so as to enable the trick plays.

[Embodiment 2]

A recording/reproduction method according to a second embodiment for converting a coding rate of data itself which has been recorded first in a HDD will be described.

Data of a 9 Mbps-fixed rate (CBR) are recorded in the HDD 8, for example. Consider the case where when the data are to be dubbed onto the optical disk 9 to store the data permanently, the data are converted into data of a 3 Mbps-variable rate (VBR) and then recorded, to enable a longer-time recording.

Initially, the 9-Mbps CBR data is read from the HDD 8 and reproduced, and decoded by the video decoding means 11. The decoded data is supplied to the video coding means 2 through the switch S1, and VBR coding for the decoded data is performed by the means 2. Re-encoded data (VBR data) which has been obtained by the VBR coding for the decoded data passes through the system encoding means 5, the navigation information addition means 6 and the recording means 7, and recorded in the HDD 8 as 3 Mbps-VBR data.

The navigation information addition means 6 does not yet know positional information of a future GOP, whose corresponding VBR data has not been inputted yet. Therefore, the means 6 cannot add navigation information to the VBR data in real time. Accordingly, while the VBR data is recorded in the HDD 8, positional information of each GOP is recorded in a storage area which is different from the storage area of the VBR data in the semiconductor memory or the HDD 8 that can be controlled by the CPU 18. Then, after the CBR data is re-encoded so that its coding rate is converted from 9 Mbps to 3 Mbps, the 3 Mbps-VBR data is read again from the HDD 8 by the reproduction means 10. Further, the read VBR data is supplied to the navigation information addition means 6 via the switch S4, and navigation information including positional information with respect to each GOP, of its previous and subsequent GOPs is added to the VBR data by the navigation information addition means 6. The VBR data to which the navigation information has been added is recorded on the optical disk 9 through the switch S5 and the recording means 7.

As described above, according to the recording/reproduction method of this second embodiment, CBR data recorded in the HDD 8 is re-encoded, thereby converting the data into VBR data, positional information of each GOP in the VBR data is obtained, then positional information with respect to each GOP, of its previous and subsequent GOPs is added to the VBR data, and thereafter the VBR data to which the positional information has been added is recorded on the optical disk 9. Therefore, when MPEG data are dubbed, the amount of the MPEG data can be reduced, as well as the MPEG data whose amount has been reduced can be recorded to enable the trick plays.

In this second embodiment, when navigation information is added to each GOP, re-encoded 3 Mbps VBR data is temporarily recorded in the HDD 8. However, for example, when the navigation information addition means 6 has the memory means 19 as a work area, the VBR data inputted to the navigation information addition means 6 can be temporarily stored in the memory means 19. In this case, the above-mentioned positional information of a future GOP can be easily known, and the positional information can be added to the VBR data almost in real time. In this case, the 3 Mbps VBR data to which the GOP positional information has been added is recorded on the optical disk 9 through the recording means 7.

However, in this case, the positional information of the previous and subsequent GOPs which is added to each GOP is limited to positional information of GOPs within a range corresponding to the amount of the VBR data stored in the memory means 19. To be more specific, when the memory means 19 is a 256 M bit-DRAM, the navigation information addition means 6 can know positional information of future GOPs which are up to about 80 sec away from each GOP of the 3 Mbps VBR data.

[Embodiment 3]

A recording/reproduction method according to a third embodiment of the present invention, by which data that has been recorded first in a HDD is a digital broadcast signal and then the digital broadcast signal is subjected to rate conversion will be described.

The digital broadcast signal is in MPEG transport stream (TS data) form and inputted through the terminal 22 in 1394 format to the 1394 I/F means 16, and then the TS data is recorded in the HDD 8 through the switch S5 and the recording means 7. That is, the transport stream according to MPEG is recorded in the HDD 8 as CBR data, and this stream includes no navigation information.

Further, in this third embodiment, in order to record the CBR data on the optical disk 9 for a long time, the CBR data is converted into VBR data, and further navigation information is added to the VBR data and recorded on a recording medium.

In this third embodiment, the data recording/reproduction process is carried out almost in the same manner as that in the second embodiment. However, the video decoding means 11 decodes the CBR data, the video coding means 2 re-encodes the CBR data, thereby converting the CBR data into VBR data, and the system encoding means 5 creates a program stream (PS) as AV data (MPEG data).

The way of adding navigation information to this program stream is the same as that in the second embodiment.

Accordingly, the conversion of the data format from TS data into PS data can be performed simultaneously with to the coding rate conversion.

According to the recording/reproduction method of this third embodiment, the rate conversion process for re-encoding AV data recorded in the HDD 8, thereby converting the AV data from CBR data into VBR data is carried out, as well as the stream form conversion process for converting the AV data from TS data into PS data is carried out, whereby the positional information with respect to each GOP, of its previous and subsequent GOPs is added to the AV data whose coding rate and stream form have been converted, and the AV data to which the positional information has been added is recorded on the optical disk 9. Therefore, when AV data (MPEG data) is dubbed, the amount of the MPEG data can be reduced, as well as the data format can be converted. Besides, the AV data whose amount has been reduced and whose data format has been converted can be recorded so as to enable the trick plays.

[Embodiment 4]

A recording/reproduction method according to a fourth embodiment of the present invention, by which data recorded first in a HDD is a HD (high-definition) digital broadcast signal and the coding rate thereof is converted will be described.

This fourth embodiment is different from the third embodiment in that the video decoding means 11 has functions of decoding TS data of CBR corresponding to a high-definition signal (HD signal), and converting decoded data corresponding to the HD signal into data corresponding to a standard signal (SD signal).

The CBR data corresponding to the standard signal outputted from the video decoding means 11 is inputted to the video coding means 2 through the switch S1. The means 2 re-encodes the CBR data, thereby converting the data into VBR data, and then the VBR data is inputted to the system encoding means 5. Then, AV data including the VBR video data outputted from the system encoding means 5 is recorded in the HDD 8 or on the memory means 19, thereafter navigation information is added to the data like in the third embodiment, and the data is finally recorded on the optical disk 9.

As described above, according to the recording/reproduction method of the fourth embodiment, the rate conversion process for re-encoding AV data corresponding to a HD signal recorded in the HDD 8, thereby converting the data from CBR data into VBR data is carried out, as well as the conversion process for further converting the AV data from data corresponding to the HD signal into data corresponding to the SD signal is carried out, whereby positional information with respect to each GOP, of its previous and subsequent GOPs is added to the AV data which has been subjected to the rate conversion process and the conversion process, and the AV data to which the positional information has been added is recorded on the optical disk 9. Therefore, when AV data (MPEG data) is dubbed, the amount of the MPEG data can be reduced as well as the definition can be converted. Besides, the AV data whose amount has been reduced and whose definition has been converted can be recorded so as to enable the trick plays.

[Embodiment 5]

A recording/reproduction method according to a fifth embodiment of the present invention will be described.

In this recording/reproduction method according to the fifth embodiment, when re-encoding of audio data is unnecessary, only re-encoding of video data is performed. Here, the operations for the re-encoding of video data and the addition of positional information of GOPs are the same as those in the second embodiment.

When the coding rate of audio data is converted or the conversion method thereof is changed, the re-encoding is required and therefore following re-encoding will be performed.

Audio data outputted from the reproduction means 10 is decoded by the audio decoding means 12 and inputted as decoded audio data to the audio coding means 4 through the switch S2. The decoded audio data inputted to this means 4 is re-encoded and inputted as re-encoded audio data to the system encoding means 5 through the switch S3. The re-encoded audio data and the re-encoded video data are multiplexed by the means 5, and the multiplexed data is outputted as AV data.

On the other hand, when the re-encoding of audio data is unnecessary, the output of the reproduction means 10 is delayed by the audio delay means 13 and inputted as delayed audio data to the system encoding means 5 through the switch S3. The delayed audio data and the re-encoded video data are multiplexed by the means 5.

As described above, according to the recording/reproduction method of the fifth embodiment, when AV data recorded in the HDD 8 is to be re-encoded and when the re-encoding of audio data is unnecessary, the re-encoding of the audio data included in the AV data is not performed, the audio data read from the HDD 8 is delayed and multiplexed with re-encoded video data, and AV data obtained by this multiplexing is recorded on the optical disk 9. Therefore, the degradation in the quality of audio due to the re-encoding of the audio signal at the dubbing can be avoided.

Further, the process for re-encoding video data and the process for adding navigation information to AV data (MPEG data) are carried out in the same manner as in the second embodiment. Therefore, when the AV data is to be dubbed, the AV data can be converted into data having a reduced amount and for which the trick play can be performed.

[Embodiment 6]

A recording/reproduction method according to a sixth embodiment of the present invention will be described.

The recording/reproduction method of the sixth embodiment is identical to the recording/reproduction method of the second embodiment except in that it includes a postrecording process and an audio multiplexing process. Here, the process for re-encoding video data and the process for adding navigation information to MPEG data are not described here.

Initially, the postrecording process in the recording/reproduction method of the sixth embodiment will be described.

Here, in the postrecording process, a viewer performs recording in synchronization with video which is displayed on the basis of a reproduced video signal from the terminal 23 of the recording/reproduction apparatus (see FIG. 1).

When an analog audio signal is inputted from outside to the terminal 21 of the recording/reproduction apparatus, the audio signal is converted into a digital audio signal by the A/D conversion means 3, and this digital audio signal is inputted to the audio coding means 4 through the switch S2.

A coding process for the digital audio signal is carried out in the audio coding means 4, and audio data which is obtained by this coding process is inputted to the system encoding means 5 through the switch S3. The audio data and re-encoded video data are multiplexed by the system encoding means 5, and multiplexed data is outputted to the navigation information addition means 6 as AV data. The navigation information is added to this AV data and then the AV data is recorded on the optical disk 9, like in the second embodiment.

In this postrecording process, the audio data in the MPEG data recorded in the HDD 8 is replaced with audio data to be postrecorded (postrecording audio data) which is inputted from outside.

Next, the audio multiplexing process of the recording/reproduction method according to this sixth embodiment will be described.

Here, in this audio multiplexing process, original audio data and postrecording audio data from outside are time-axis multiplexed.

An audio signal inputted from outside is converted into a digital audio signal by the A/D conversion means 3 like in the postrecording process, and inputted to the audio coding means 4 through the switch S2. The encoding process for the digital audio signal is carried out by the means 4, and audio data (postrecording audio data) obtained by this encoding process is outputted to the switch S3.

On the other hand, audio data which is obtained by delaying original audio data (audio data included in the MPEG data which is recorded in the HDD 8) is outputted from the audio delay means 13, and the delayed audio data is outputted to the switch S3.

In this switch S3, the time-axis multiplexing process for switching the postrecording audio data from the audio coding means 4 and the original audio data from the audio delay means 13, to select one of the data is carried out, and multiplexed audio data which is obtained by this time-axis multiplexing process is outputted to the system encoding means 5. In this system encoding means 5, an AV multiplexing process for multiplexing the multiplexed audio data and re-encoded video data is carried out, and AV data obtained by this AV multiplexing process is outputted to the navigation information addition means 6. The navigation information is added to this AV data, and then the AV data is recorded on the optical disk 9, like in the second embodiment.

In this audio multiplexing process, the postrecording audio data inputted from outside is inserted into MPEG data recorded in the HDD 8, whereby the MPEG data recorded on the optical disk 9 includes two audio streams.

As described above, according to the recording/reproduction method of this sixth embodiment, when MPEG data recorded in the HDD 8 is to be re-encoded, the process of replacing original audio data included in the MPEG data with audio data from outside, or the process of inserting the audio data from outside into the MPEG data is carried out, thereby enabling the postrecording at the dubbing.

In this sixth embodiment, the description has been given of the process of replacing the original audio data included in the MPEG data with the audio data from outside or the process of inserting the audio data from outside into the MPEG data, when the MPEG data is to be re-encoded. However, when the MPEG data is to be re-encoded, a process of composing the original audio data included in the MPEG data with the audio data from outside may be carried out.

[Embodiment 7]

A recording/reproduction method according to a seventh embodiment of the present invention will be described.

In this recording/reproduction method of the seventh embodiment, navigation information is added to MPEG data almost in real time.

Figure 4:
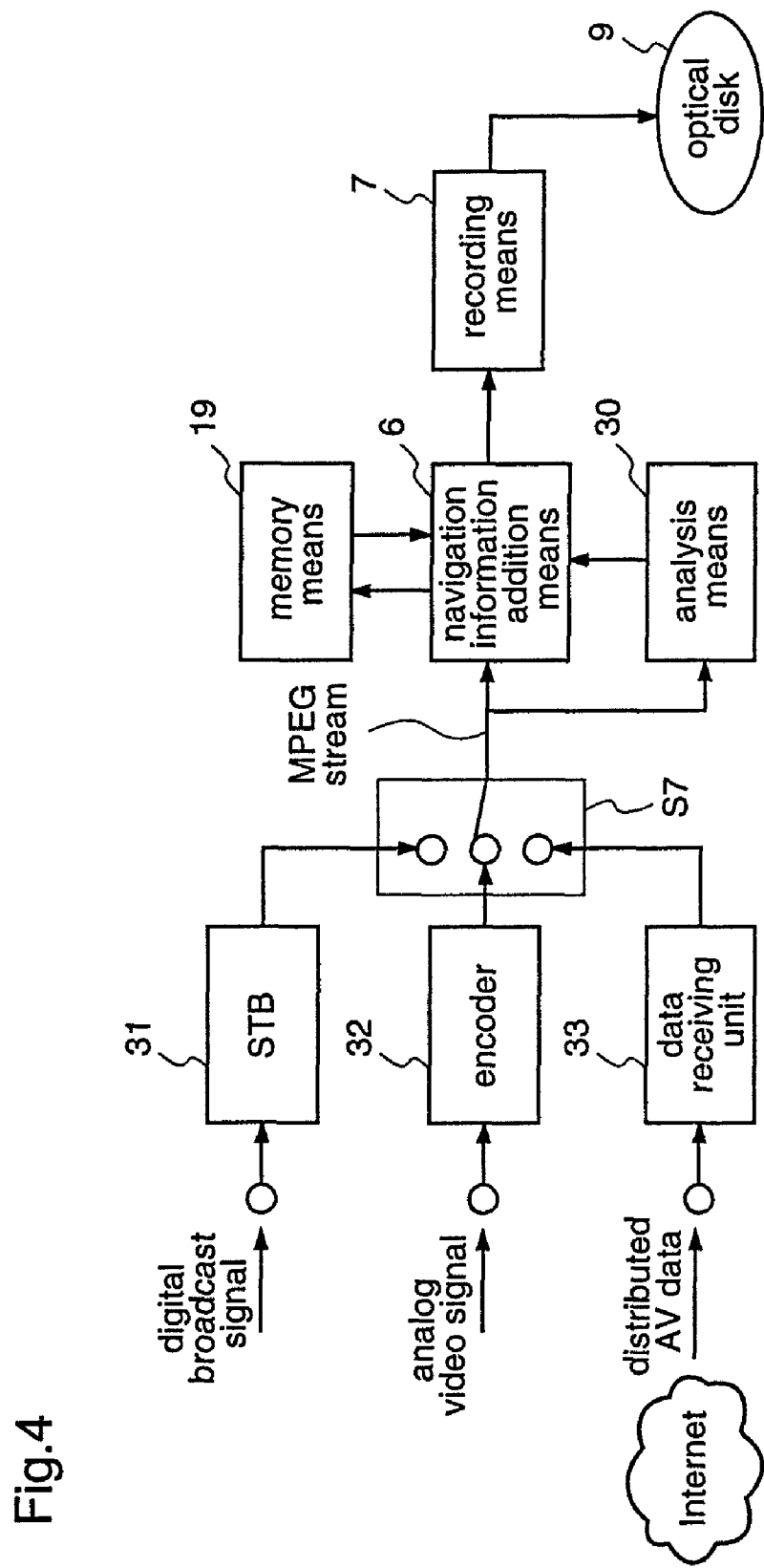
FIG. 4 is a block diagram schematically illustrating a structure of a recording/reproduction apparatus according to a seventh embodiment of the present invention.

FIG. 4 is a block diagram schematically illustrating a structure of a recording/reproduction apparatus which records MPEG data by the recording/reproduction method of the seventh embodiment.

The recording/reproduction apparatus of the seventh embodiment has, in addition to the structure of the recording/reproduction apparatus shown in FIG. 1 according to the first embodiment, a STB (Set-Top Box) 31 for receiving a digital broadcast signal, an encoder 32 for encoding an analog video signal, a distributed data receiving unit 33 for receiving AV data, such as MPEG data, which is distributed via a computer network such as an Internet, and a switch S7 which selects data outputted from any of the STB 31, the encoder 32 and the distributed data receiving unit 33 and outputs the selected data. In FIG. 4, the same reference numerals as those in FIG. 1 denote the same components of the recording/reproduction apparatus according to the first embodiment. In addition, the encoder 32 corresponds to the means 1 to 5 and the switches S1 to S3 in the recording/reproduction apparatus shown in FIG. 1. Further, data outputted from the switch S7 of the seventh embodiment corresponds to data outputted from the system encoding means 5 of the first embodiment.

In this seventh embodiment, as sources of MPEG streams to be recorded (MPEG data), there are conceivable the output data of the STB (Set-Top Box) 31 which receives a digital broadcast signal, the output data of the encoder 32 which encodes an analog video signal, the output data of the distributed data receiving unit 33 which receives MPEG data distributed via the computer network such as the Internet or the like.

One of the output data of the STB 31, the encoder 32 and the distributed data receiving unit 33 is selected by the switch S7, and an MPEG stream supplied as the output data from each unit is inputted to the navigation information addition means 6 and the analysis means 30.

The operations of the navigation information addition means 6, the analysis means 30 and the recording means 7 are performed in the same manner as those in the recording/reproduction apparatus shown in FIG. 3 according to the first embodiment.

This seventh embodiment is different from the first embodiment in that series of processes such as addition of navigation information and analysis of MPEG data should be performed almost in real time.

To be more specific, when the MPEG data is inputted to the navigation information addition means 6, the navigation information addition means 6 carries out a process for temporarily storing the data into the memory means 19 included in the means 6 as a work area. The analysis means 30 carries out a positional information detection process with respect to the data stored in the memory means 19, for detecting positional information of each GOP. Then, the navigation information addition means 6 carries out a process for adding positional information which indicates positions with respect to each GOP of its previous and subsequent GOPs to the MPEG data, on the basis of the positional information obtained by the analysis means 30.

In this case, the positional information of the previous and subsequent GOPs which is added to each GOP is limited to positional information of GOPs within a range corresponding to the amount of the MPEG data stored in the memory means 19.

As described above, in this recording/reproduction method according to the seventh embodiment, when a digital broadcast signal or distributed data on the Internet is received and recorded as MPEG data or when an analog video signal from outside is encoded and recorded as MPEG data, the MPEG data is temporarily stored in the memory means 19, and then the stored MPEG data is analyzed to obtain positional information of each GOP. Therefore, when the MPEG data is recorded, the process of adding the positional information with respect to each GOP of its previous and subsequent GOPs to the MPEG data can be carried out in approximately real time.

[Embodiment 8]

A recording/reproduction method according to an eighth embodiment of the present invention will be described.

In the recording/reproduction method according to the eighth embodiment, while AV data such as MPEG data is dubbed at high speeds, the addition of navigation information, the conversion of the coding rate, the conversion of the signal format and the like is performed.

Since the data recorded in the recording medium HDD 8 is normally displayed by decoding the data, the data is read out at a real time reproduction speed. However, when the decoding display process for the data is not carried out or the decoding display process for the data is intermittently carried out, the reading of the data from the HDD 8 can be performed at a speed higher than the real time reproduction speed.

In the recording/reproduction apparatus according to this eighth embodiment, data (first MPEG data) recorded in the HDD 8 (see FIG. 1) is read at the maximum transfer rate of the HDD 8 at dubbing in which the normal decoding display process is not carried out, then data processing according to any of the aforementioned embodiments such as the addition of the navigation information, the conversion of the coding rate and the conversion of the signal format is performed at a speed which is higher than the real time reproduction speed, and AV data (second or third MPEG data) which has been subjected to the data processing is recorded on the optical disk 9 (see FIG. 1) at a speed which is higher than the real time reproduction speed. Here, the CPU 18 (see FIG. 1) controls the entire system.

As described above, in this recording/reproduction method according to the eighth embodiment, at the dubbing in which the normal decoding display process is not carried out, the reading of data recorded in the HDD 8 is performed at a higher speed than the real time reproduction speed. Therefore, the addition of the navigation information, the conversion of the coding rate and the conversion of the signal format for MPEG data can be performed with performing the high-speed dubbing of the MPEG data.

For example, in a case where the HDD 8 having the maximum transfer rate of 20 Mbps is employed and the normal reproduction speed of AV data recorded in the HDD 8 is 5 Mbps, while the high-speed (about quadruple-speed) dubbing is being performed, the AV data can be subjected to the data processing such as the addition of the navigation information, the conversion of the coding rate, and the conversion of the signal format.

In this eighth embodiment, the description has been given of the case where the recording/reproduction apparatus performs the high-speed dubbing. However, at the aforementioned high-speed dubbing, this apparatus may transmit data read from the HDD (data to be reproduced) or data which is to be recorded on the optical disk (data to be recorded), to the STB or the like in 1394 format as a recording signal or a reproduction signal.

In this case, the recording signal or reproduction signal is supplied to the 1394 I/F means 17 via the switch S6, whereby the signal is outputted through the terminal 25.

In any of the aforementioned embodiments, the HDD and the optical disk are employed as the recording media, while the recording medium may be a magneto-optical disk, a magnetic tape, or a semiconductor memory.

Further, in any of the aforementioned embodiments, the SD signal, the HD signal, the CBR data, the VBR data, and the MPEG data (TS data or PS data) are shown as data recorded in the HDD. However, the data recorded in the HDD may be elementary data, digital data of a DVC (Digital Video Camera) or the like.

It goes without saying that the MPEG data shown in any of the above-mentioned embodiments is more specifically data conforming to any of MPEG standards such as MPEG1, MPEG2, MPEG4 and MPEG7. In addition, the first, second and third recording media in the embodiments can be a separate recording medium, respectively, or may be one recording medium.

Further, in any of the aforementioned embodiments, the recording/reproduction apparatus is implemented by hardware, while this apparatus can be implemented by software. In this case, when a recording/reproduction program for implementing the recording/reproduction process according to any of the aforementioned embodiments is recorded in a data storage medium such as a floppy disk, the recording/reproduction apparatus according to any of the aforementioned embodiments can be constructed in an independent computer system.

Figure 5A:
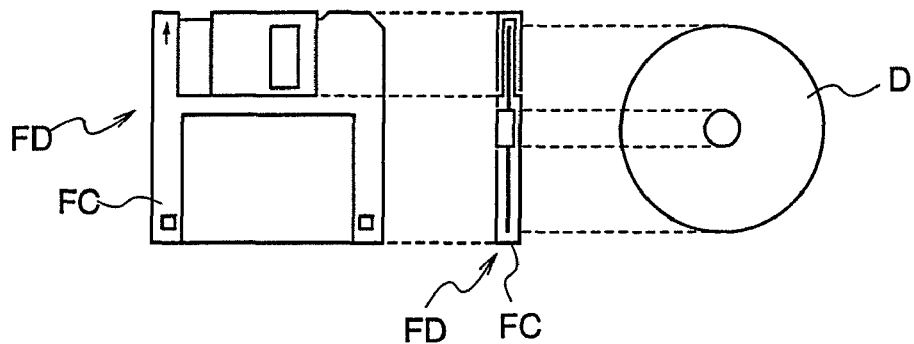
FIGS. 5(a) and 5(b) are diagrams for explaining a data storage medium which contains a program for implementing a recording/reproduction process according to any of the embodiments by a computer system.
Figure 5B:
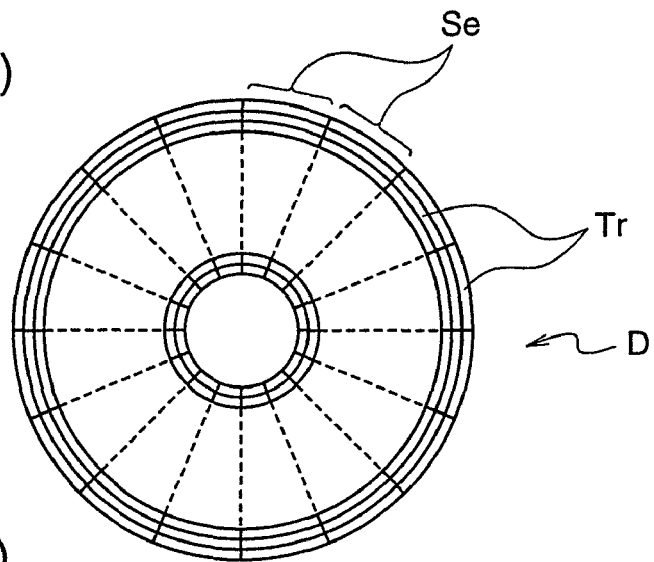
Figure 5C:
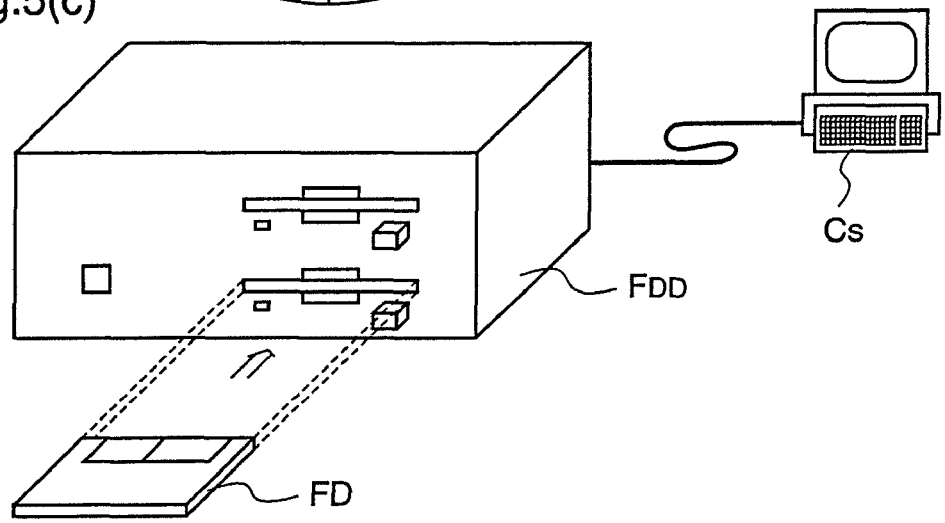
FIG. 5(c) is a diagram for explaining the computer system.

FIGS. 5(a)-5(c) are diagrams for explaining the case where the recording/reproduction process according to any of the aforementioned embodiments is executed by a computer system using a floppy disk which contains the recording/reproduction program.

FIG. 5(a) shows a front view of a floppy disk FD, a cross-sectional view thereof, and a floppy disk body D. FIG. 5(b) shows an example of a physical format of the floppy disk body D.

The floppy disk FD is composed of the floppy disk body D and a case FC which contains the floppy disk body D. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the above-mentioned program, data of the program are recorded in the assigned sectors on the floppy disk body D.

FIG. 5(c) shows the structure for recording the program in the floppy disk FD and performing the recording/reproduction process with software.

To be specific, when the program is recorded in the floppy disk FD, data of the program are written in the floppy disk FD from the computer system (personal computer) Cs through the floppy disk drive FDD. When the above-mentioned recording/reproduction apparatus is constructed in the computer system Cs by the program recorded in the floppy disk FD, the program is read from the floppy disk FD by the floppy disk drive FDD and then loaded to the computer system Cs.

In this computer system, not only coding and decoding of video signals and audio signals but also writing and reading for storage media such as a HDD, an optical disk and a memory can be implemented by software.

Although in the description of FIG. 5 a floppy disk is employed as a data storage medium, an optical disk may be employed. Also in this case, recording and reproduction can be performed by software in like manner as the case of using the floppy disk. The data storage medium is not restricted to the optical disk and the floppy disk, and any medium may be employed as long as it can contain the program, for example, an IC card or a ROM cassette. Also in the case where these data storage media are employed, the recording and reproduction using software can be implemented in the same manner as the case of using the floppy disk.

What is claimed is:

1. A recording/reproduction method by which data is read from a first recording medium containing first MPEG data which is divided taking a given data unit as one data group, and a recording/reproduction process for the read data is carried out, comprising:

a reading step of reading the first MPEG data from the first recording medium;

a decoding step of decoding the read first MPEG data to generate a decoded signal;

a re-encoding step of re-encoding the decoded signal so as to make the amount of information smaller than that of the first MPEG data, to generate second MPEG data;

an information obtaining step of obtaining positional information which indicates positions of previous and subsequent data groups of a specific data group in the second MPEG data with respect to said specific data group, on the basis of the second MPEG data;

an information addition step of adding the positional information at a determined position in the second MPEG data, to generate third MPEG data; and a recording step of recording the third MPEG data on a second recording medium, wherein in the reading step, the first MPEG data is read at a speed which is higher than a real time reproduction speed at which the first MPEG data is normally decoded and displayed, and in the recording step, the second MPEG data is written on the second recording medium at a speed which is higher than a real time reproduction speed at which the second MPEG data is normally decoded and displayed.

2. A recording/reproduction method by which data is read from a first recording medium containing first MPEG data which is divided taking a given data unit as one data group, and a recording/reproduction process for the read data is carried out, comprising:

a reading step of reading the first MPEG data from the first recording medium;

a decoding step of decoding the read first MPEG data to generate a decoded signal;

a re-encoding step of re-encoding the decoded signal so as to make the amount of information smaller than that of the first MPEG data, to generate second MPEG data;

an information obtaining step of obtaining positional information which indicates positions of previous and subsequent data groups of a specific data group in the second MPEG data with respect to said specific data group, on the basis of the second MPEG data;

an information addition step of adding the positional information at a determined position in the second MPEG data, to generate third MPEG data; and a recording step of recording the third MPEG data on a second recording medium, wherein in the decoding step, only video data included in the first MPEG data is decoded to generate a decoded video signal;

in the re-encoding step, the decoded video signal is re-encoded to generate re-encoded video data, and the re-encoded video data is multiplexed with delayed audio data which is obtained by delaying audio data included in the first MPEG data, thereby generating multiplexed data; and in the recording step, the multiplexed data is recorded as the second MPEG data.

3. A recording/reproduction method by which data is read from a first recording medium containing first MPEG data which is divided taking a given data unit as one data group, and a recording/reproduction process for the read data is carried out, comprising:

a reading step of reading the first MPEG data from the first recording medium;

a decoding step of decoding the read first MPEG data to generate a decoded signal;

a re-encoding step of re-encoding the decoded signal so as to make the amount of information smaller than that of the first MPEG data, to generate second MPEG data;

an information obtaining step of obtaining positional information which indicates positions of previous and subsequent data groups of a specific data group in the second MPEG data with respect to said specific data group, on the basis of the second MPEG data;

an information addition step of adding the positional information at a determined position in the second MPEG data, to generate third MPEG data; and a recording step of recording the third MPEG data on a second recording medium, wherein in the re-encoding step, one of data processings:

a data insertion processing for inserting external audio data which is obtained by coding an audio signal from outside, into the second MPEG data;

a data replacement processing for replacing the external audio data with audio data in the second MPEG data; and a data composition processing for composing the external audio data with the audio data in the second MPEG data, is performed.

4. The recording/reproduction method of claim 2 wherein the information obtaining step includes:

a step of recording the second MPEG data on a third recording medium;

a step of reading the second MPEG data from the third recording medium; and a step of obtaining positional information which indicates positions of previous and subsequent data groups of a specific data group in the read second MPEG data with respect to said specific data group, on the basis of the second MPEG data.

5. The recording/reproduction method of claim 2 wherein the first recording medium contains MPEG data of a fixed rate as the first MPEG data, and in the re-encoding step, a decoded signal corresponding to the fixed-rate MPEG data is re-encoded, thereby generating MPEG data of a variable rate as the second MPEG data.

6. The recording/reproduction method of claim 5 wherein the information obtaining step includes:

a step of recording the variable-rate MPEG data on a third recording medium as the second MPEG data;

a step of reading the variable-rate MPEG data from the third recording medium; and a step of obtaining positional information which indicates positions of previous and subsequent data groups of a specific data group in the read variable-rate MPEG data with respect to said specific data group, on the basis of the variable-rate MPEG data.

7. The recording/reproduction method of claim 2 wherein the re-encoding step includes: a conversion step of converting a decoded signal having a prescribed resolution, corresponding to the first MPEG data, into a signal having a resolution which is lower than the prescribed resolution; and a step of re-encoding the converted signal to generate the second MPEG data.

8. The recording/reproduction method of claim 7 wherein the information obtaining step includes:

a step of recording the second MPEG data on a third recording medium;

a step of reading the second MPEG data from the third recording medium; and a step of obtaining positional information which indicates positions of previous and subsequent data groups of a specific data group in the read second MPEG data with respect to said specific data group, on the basis of the second MPEG data.

9. The recording/reproduction method of claim 7 wherein the decoded signal corresponding to the first MPEG data is a high-definition signal and the signal which is generated by converting the resolution of the decoded signal is a standard signal.

10. The recording/reproduction method of claim 2 including:

a coding step of coding a video signal by an MPEG coding system to create video data and simultaneously coding an audio signal to create audio data;

a multiplexing step of multiplexing the audio data and the video data to generate the first MPEG data; and a preprocessing recording step of recording the first MPEG data on the first recording medium.

11. The recording/reproduction method of claim 2 wherein in the information addition step, the positional information indicating the positions of the previous and subsequent data groups of the specific data group with respect to said specific data group is added in the vicinity of the head of said specific data group.

12. The recording/reproduction method of claim 2 wherein the MPEG data is coded data which conforms to any of MPEG1, MPEG2, MPEG4, and MPEG7 standards.

13. The recording/reproduction method of claim 2 wherein the first and second MPEG data are transport streams or program streams.

14. The recording/reproduction method of claim 2 wherein the data group is composed of one or plural GOPs each being an access unit at reproduction.

15. The recording/reproduction method of claim 2 wherein the first and second recording media are any of a hard disk, an optical disk, a magneto-optical disk, a semiconductor memory, and a magnetic tape.

16. The recording/reproduction method of claim 2 wherein the first and second recording media are one and the same data recording medium.

* * * * *